US006583852B2

(12) United States Patent
Baum et al.

(10) Patent No.: US 6,583,852 B2
(45) Date of Patent: Jun. 24, 2003

(54) APPARATUS, ARCHITECTURE AND METHOD FOR HIGH-SPEED PRINTING

(75) Inventors: Daniel Baum, Menlo Park, CA (US); Jeff Boone, Sunnyvale, CA (US); Russ Muzzolini, Woodside, CA (US); Jarrett Redd, San Jose, CA (US); Jeannine Smith, Menlo Park, CA (US); John Voris, Los Gatos, CA (US); Xin Wen, Palo Alto, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 09/871,022

(22) Filed: May 31, 2001

(65) Prior Publication Data

US 2002/0034392 A1 Mar. 21, 2002

Related U.S. Application Data

(60) Provisional application No. 60/234,461, filed on Sep. 21, 2000.

(51) Int. Cl.[7] .................................... G03B 27/52
(52) U.S. Cl. .................................... 355/40; 396/599
(58) Field of Search .................... 355/355, 38, 40, 355/41, 27–29; 396/599, 617, 620, 626; 156/249

(56) References Cited

U.S. PATENT DOCUMENTS 4,823,163 A * 4/1989 Rollet et al. .................. 355/39
5,647,938 A * 7/1997 Levine ...................... 156/249
5,886,774 A * 3/1999 Nishida et al. ............... 355/27
5,936,709 A * 8/1999 Yamamoto .................. 355/40
6,157,436 A * 12/2000 Cok ........................... 355/40

FOREIGN PATENT DOCUMENTS

JP 4-314047 * 11/1992 ........... G03B/27/46

* cited by examiner

*Primary Examiner*—D. Rutledge
(74) *Attorney, Agent, or Firm*—Tran & Associates

(57) ABSTRACT

A high-speed digital photographic printing system and method includes image-specific backprinting and automatic tracking and sorting of printed jobs. The system includes one or more photographic printers, where each printer can have a different printing rate. A scheduler schedules printing orders to the different printers. The printer-independent image rendering is conducted asynchronous to the printing to maximize the printing throughput. In some embodiments, the rendering image processor does the vast majority of the image processing and outputs a printer-independent data file (generally much larger than the source image data file) that requires little if any further data manipulations or processing in the exposure unit. A photographic printing method and system for producing prints in response to input digital images includes a high-speed exposure unit that exposes a photosensitive material coated on a substrate in response to the input digital image, a chemical processor unit that receives and processes the exposed photosensitive material to form visible dye images on the substrate, a backprinting unit that receives the substrate having the visible dye images and prints information on the opposite surface of the substrate to the dye image, and a cutting unit that produces separate sheets of printed images after the backprinting unit prints information.

61 Claims, 5 Drawing Sheets

APPARATUS, ARCHITECTURE AND METHOD FOR HIGH-SPEED PRINTING

CROSS-REFERENCES TO RELATED INVENTIONS

This application claims priority from U.S. Provisional Application Ser. No. 60/234,461, filed on Sep. 21. 2000.

FIELD OF THE INVENTION

This invention relates to the field of image printing, and more specifically to an apparatus, architecture and method for high-speed printing of digital image data onto a photosensitive substrate such as paper.

BACKGROUND OF THE INVENTION

For many years, color photographs were produced in an analog process based on silver-halide chemistry. An image was captured by exposing a photo-sensitive film to a scene by a lens system in a camera. The photo-sensitive film was developed producing a dye image on the film. A photosensitive paper was in turn exposed to an image formed by the dye image on the film to generate a photographic print. Lens systems can be used to enlarge the image that is printed onto the paper substrate.

As with other systems, photography can benefit from digital techniques applied to various aspects of the process. However, it is still often desirable to retain certain aspects of prior technologies. Image data, captured by a digital camera or digitized from a reflective print or a film by a scanner, can be transmitted anywhere in the world almost instantaneously and then stored on mass storage devices. Multiple copies can be easily made and stored at multiple different sites. The image data can be manipulated using image-processing software systems. Ultimately, the digital image data can be printed on paper (or film or other substrate) to generate high-quality photographic images for viewing and sharing.

The digital image data are converted into a light pattern that is imaged onto a photographic paper that is processed using a conventional chemical process for color prints. Typically, the photographic paper, in the form of a long roll or a cut sheet, is exposed to form a series of latent images, then passed through the chemical processor in a continuous fashion. The roll paper is cut into individual prints. Conventionally, a stack of such photographic prints would be placed back into an envelope used to submit the film for processing. However, in the case of digital images that can be submitted across the internet, there is no such envelope, so one must be generated and addressed to the customer or recipient for the photos.

Image data are often compressed. To generate a print of such compressed images, one must uncompress the data and perform image processing on the uncompressed image data. The image processing operations can include tone or color adjustment, neutral balance, and image enhancement. The compression function is typically performed in a computer programmed with the algorithm needed to uncompress the data. If the uncompression and the image processing are not fast enough, this function can become a bottleneck, limiting the overall speed of the system.

The process for generating photographic prints includes a number of different subprocesses, such as preprocessing the image data, converting the image data into an image exposure pattern to expose a photosensitive material coated on a substrate to form a latent image, processing the photosensitive material to form a dye image, optionally printing on the back of each print, cutting and stacking the prints, and packaging and shipping the prints. Any of these processes can become a bottleneck that limits the overall speed of the system.

Thus, there is a need for a method and apparatus that can quickly reproduce photographic prints in response to a stream of input digital images.

SUMMARY OF THE INVENTION

The present invention provides a high-speed digital photographic printing system includes image-specific backprinting and automatic tracking and sorting of printed jobs. The high-speed digital photographic printing system includes a plurality of photographic printers, where each printer can have a different printing rate. A scheduler schedules printing orders to the different printers. The printer-independent image rendering is conducted asynchronous to the printing to maximize the printing throughput. In some embodiments, the rendering image processor does the vast majority of the image processing and outputs a printer-independent data file (generally much larger than the source image data file) that requires little if any further data manipulations or processing in the exposure unit.

One aspect of the present invention provides a photographic printing system for producing prints in response to input digital images. System includes a high-speed exposure unit that exposes a photosensitive material coated on a substrate in response to the input digital image, a chemical processor unit that receives and processes the exposed photosensitive material to form visible dye images on the substrate, a backprinting unit that receives the substrate having the visible dye images and prints information on the opposite surface of the substrate to the dye image, and a cutting unit that produces separate sheets of printed images after the backprinting unit prints information.

Another aspect of the present invention provides a method for high-speed photographic printing of input digital images onto a photosensitive material coated on a substrate. This method includes exposing the photosensitive material based on the input digital images, chemically processing the exposed photosensitive material to form visible dye images on the substrate, after the chemical processing, backprinting information on an opposite surface of the substrate to the dye image, and cutting the substrate to produce separate sheets of printed images, wherein the exposing is performed at an exposing rate, the chemically processing is performed at a processing rate and the exposing rate is different than the chemically processing rate.

Yet another aspect of the present invention provides a photographic printing system for producing prints in response to input digital images. This system includes a scheduler that receives digital images and scheduling the digital images to be exposed on different exposure units, a first exposure unit that exposes a photosensitive material coated on a substrate being in response to the input digital image scheduled by the scheduler, wherein the scheduler causes a first subjob of a single customer order to be exposed on the first exposure unit, a second exposure unit that exposes a photosensitive material coated on a substrate in response to the input digital image scheduled by the scheduler, wherein the scheduler causes a second subjob of the single customer order to be exposed on the second exposure unit, and a sorter unit that consolidates cut-apart prints of the first subjob and the second subjob into a single group of prints.

Still another aspect of the present invention provides a photographic printing system for producing prints in response to input digital images. This system includes a scheduler that receives digital images and schedules the digital images to be exposed at different exposure units, a print unit that exposes and develops a photosensitive material coated on a substrate being in response to the input digital image scheduled by the scheduler, a high-speed exposure unit that exposes a photosensitive material coated on a substrate in response to the input digital image scheduled by the scheduler, a chemical processor unit that receives and processes the exposed photosensitive material from the exposure unit to form visible dye images on the substrate, a backprinting unit that receives the substrate from the chemical processing unit having the visible dye images and prints information on the opposite surface of the substrate to the dye image, and a cutting unit that produces separate sheets of printed images after the backprinting unit prints the information. In this case, print unit both exposes and develops the prints, and optionally backprints, cuts and/or sorts the prints.

Another aspect of the present invention provides a photographic printing system for producing prints in response to input digital images. This system includes a plurality of photographic printer exposure units, an image cache, an image rendering unit that renders the input digital images and is operatively coupled to place the rendered images into the image cache. A scheduler is operatively coupled to the plurality of photographic printer exposure units, and schedules the rendered digital images from the image cache to be printed by each exposure unit, and an image processor associated with each printer for receiving the rendered digital images and processing the rendered digital images in accordance to the specific characteristics of the exposure unit, and such processed images being subsequently printed by the exposure unit.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

Figure 1:
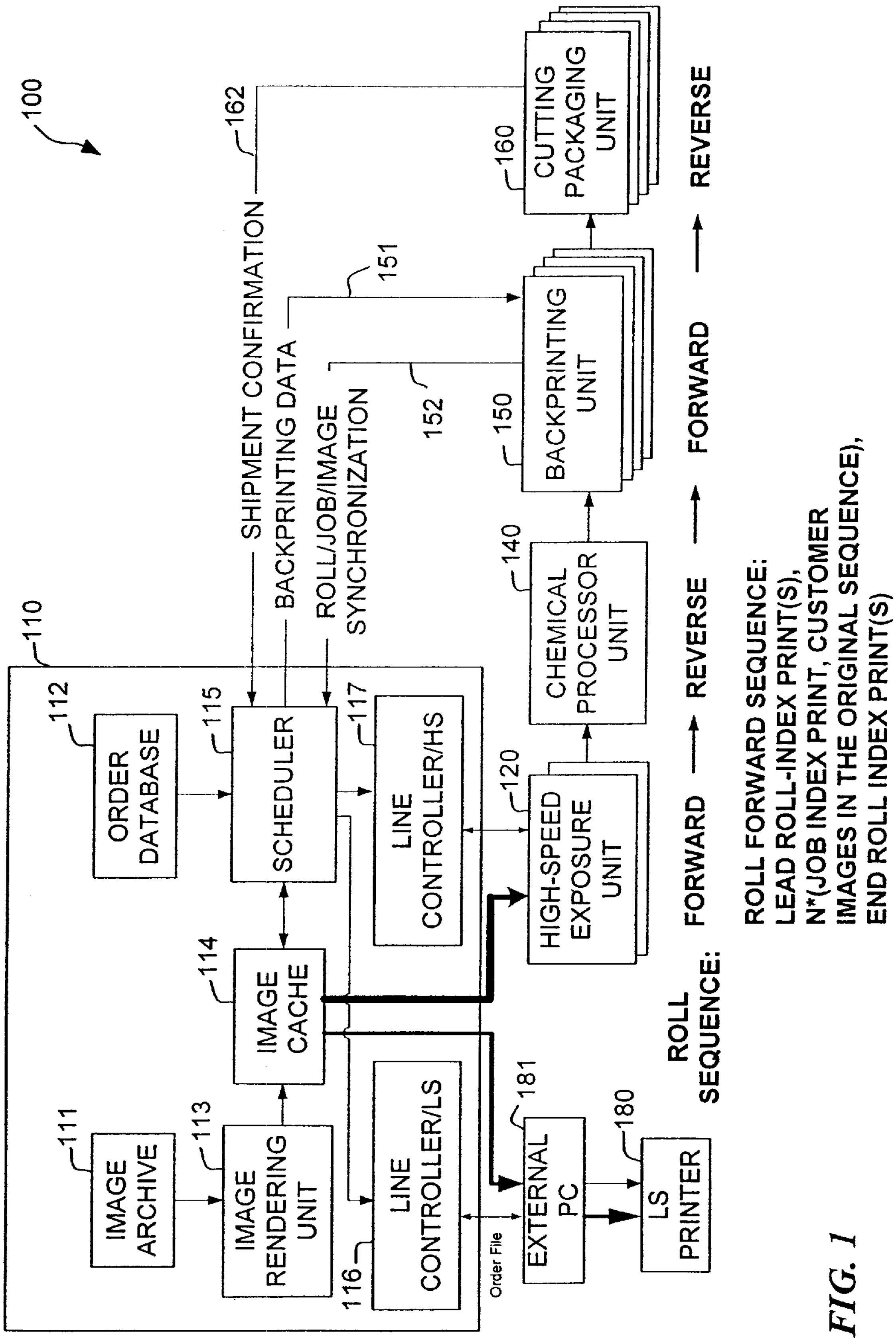
FIG. 1 shows a block diagram of one embodiment of the present invention, high-speed printing system 100.

FIG. 1 shows one embodiment of the present invention, high-speed printing system 100, having a computer system 110, one or more high-speed exposure units 120, one or more processing units 140 (in some embodiments, each processing unit 140 is a chemical processing unit for color photographic print paper), one or more backprinting units 150, and one or more cutting and packaging units 160. In some embodiments, an external computer 181 (such as a personal computer, or PC) is coupled to drive a low-speed (LS) printer 180 to print images, forms, or other pieces of information that do not lend themselves to being printed on the high-speed exposure unit.

Figure 5:
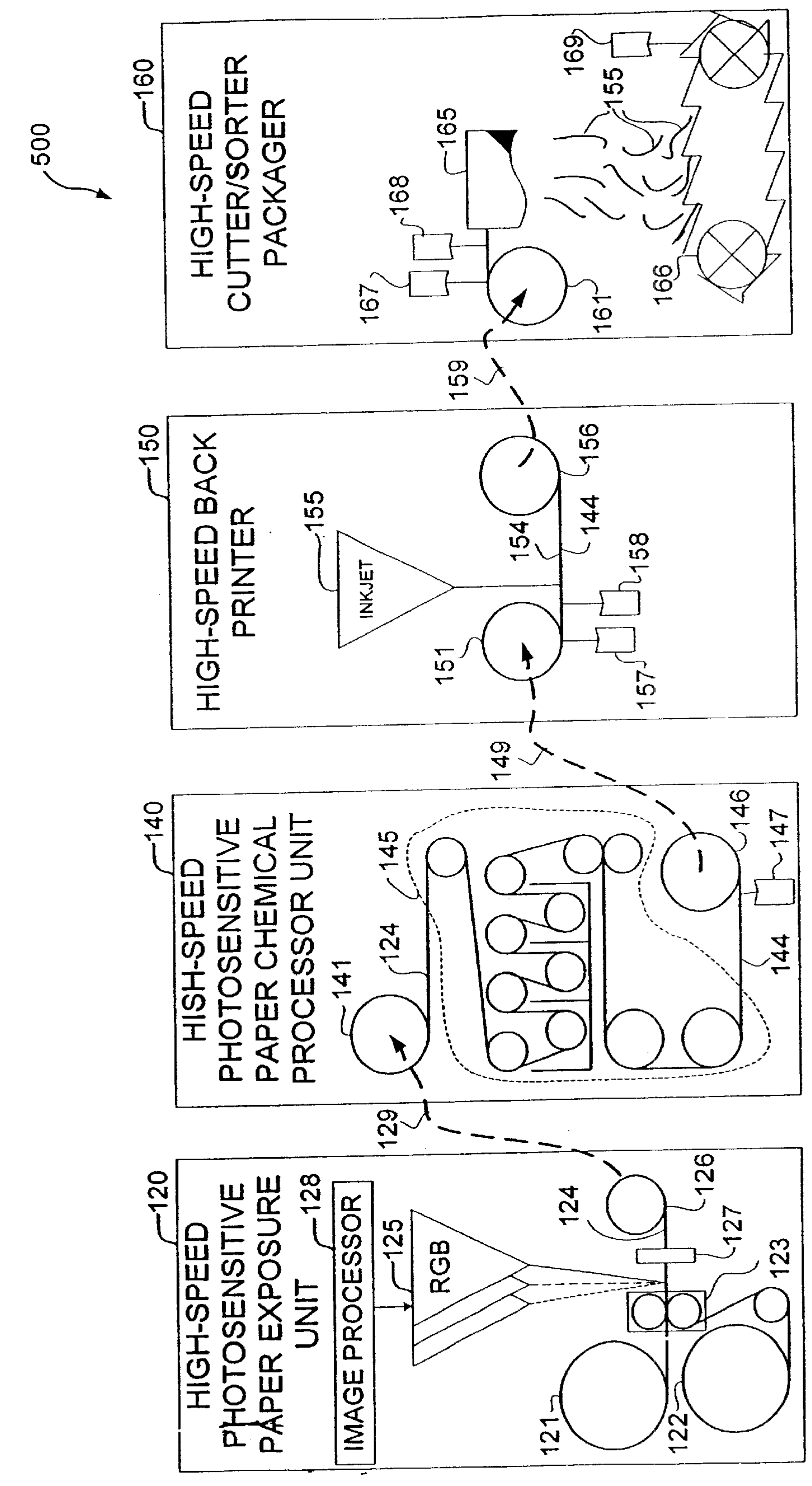
FIG. 5 shows a block diagram of a printer portion 500 of high-speed printing system 100.

Still referring to the embodiment of FIG. 1, computer system 110 includes image archive 111, order database 112, image rendering unit 113, image cache 114, scheduler 115, and high-speed (HS) line controller 117, one or more of which (e.g., scheduler 115, line controller 117, and/or image rendering unit 113) are implemented in separate computers connected to one another by a network. Some embodiments also include a low-speed (HS) line controller 116 that drives external PC 181. HS line controller 117 controls HS exposures unit(s) 120, and provides index-print and image-print information from image cache 114 to HS exposures unit(s) 120. The low-speed (HS) line controller 116 and HS line controller 117 are provided for handling computation and controlling tasks specific to each printer. The low-speed (HS) line controller 116 and HS line controller 117 can each include an image processor 128. Or alternatively, as shown in FIG. 5, the image processor 128 can reside in the LS printer 180 or the high-speed exposure units 120.

In some embodiments, LS printer 180 is a digital minilab printer that is modified to communicate with a computer network for receiving printing orders and image data to be printed. The LS printer 180 is a self-contained exposure, chemical processor, backprinter, and cutter-stacker machine. Examples of digital minilab printers usable in various embodiments include Fuji Digital Minilab Frontier 370, Gretag MasterFlex series, Kodak's Digital Lab System, Konica QD-21 printer and so on. In some embodiments, LS printer 180 produces low-volume orders or special-size prints not readily handled by the high-speed process units 120, 140, 150, and 160. In other embodiments, LS printer 180 is a lower-speed exposure unit only, which exposes latent-image prints (such as onto special paper types or sizes), which are then inserted into the later portions of the high-speed process, i.e., units 140, 150, and 160.

Not shown in FIG. 1, an additional printer, such as a laser printer, can be provided to print paper copies of each order file, showing such information as the name and address of the customer, the mailing address to which to send the completed order, the type and size of each print of each respective image, completion status of each order, and/or payment information for each order or each batch of orders.

In some embodiments, the high-speed exposure unit 120, the chemical processor unit 140, the backprinting unit 150, and the cutting packaging unit 160 are separate devices. The photographic paper needs to be transferred between these devices manually or by a vehicle (or cart). The photographic paper is input to the high-speed exposure unit 120 and then transferred to the chemical processor unit 140 in light sealed magazines. From the chemical processor unit 140 to the backprinting unit 150, and then the cutting packaging unit 160, the processed photographic paper is transferred in rolls or cut sheets under ambient light. An advantage of the present invention is that the photographic paper is automatically monitored and the scheduler tracks every printing job at every step of the workflow.

In another embodiment of the present invention, a continuous-web transport system is provided between the high-speed exposure unit 120, the chemical processor unit 140, the backprinting unit 150, and the cutting packaging unit 160. The process parameters are engineered so that the exposure, the processing, the backprinting, and the cutting are done at essentially the same rate. A light sealed paper path is provided in between the high-speed exposure unit 120 and the chemical processor unit 140 for the exposed and unprocessed paper web. An advantage of a continuous web is that it is easier for the scheduler to track the printing jobs because they are all in sequence.

In the present invention, the term "photographic printer" is used to refer to both continuous-web configuration, the configuration involving separate units (120, 140, 150, 160), or a standalone light sealed unit such as a commercial minilab printer. In general, the photographic printer receives digital images and produces dye images on a photosensitive material such as photographic paper.

In accordance to the present invention, the high-speed printing system 100 can include a plurality of low-speed photographic printers and a plurality of high-speed photographic printers. The printing rates of the plurality of high-speed photographic printers are substantially higher than the printing rates of the plurality of low-speed photographic printers. In addition, the printing rates of the plurality of high-speed photographic printers can differ among printers. Similarly, the printing rates of the plurality of low-speed photographic printers can differ among printers.

The present invention is compatible with the standard photographic paper having three-color emulsion layers (yellow, magenta, cyan), as well known in the art on the obverse side of the paper. In other embodiments, as described below, an enhanced photographic paper includes four-color emulsion layers ( yellow, magenta, cyan, plus black) on the obverse side of the paper.

However, in other embodiments, the photographic paper can have photosensitive materials coated both sides of the paper separated by opaque substrate. In this embodiment, both sides of the photographic paper is exposed in exposure unit 120 (one that includes that includes reverse-side image-projection facilities for the exposing reverse side of the undeveloped paper). The scheduler 115 transmits the backprinting information to the reverse-side image-projection facilities. In such embodiments, backprinting unit 150 is omitted, since both the obverse- and reverse-side information are exposed in such exposure unit 120, and are both developed by the processor unit 140.

Figure 2:
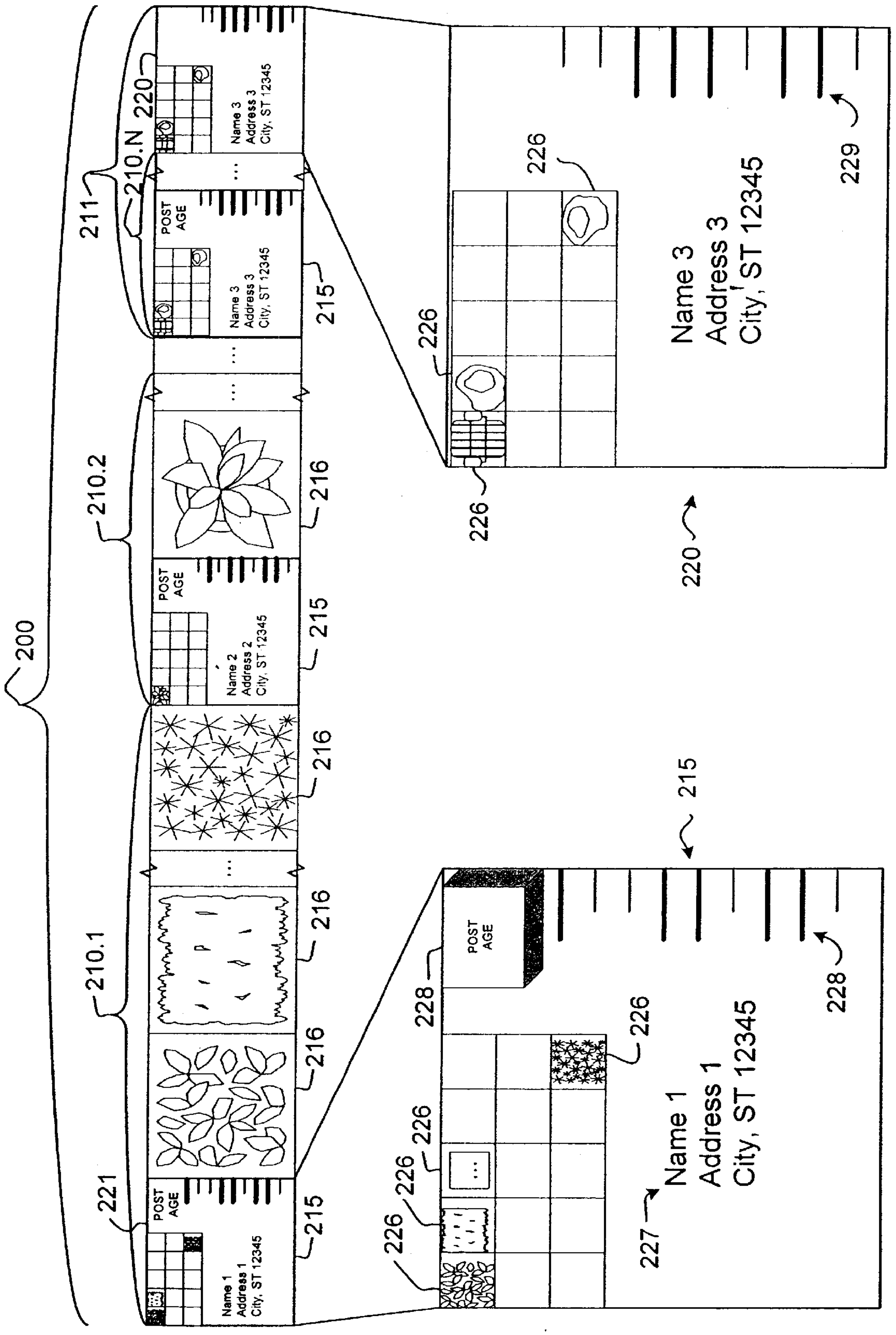
FIG. 2 shows a batch roll 200 of photographic prints of digital images with index prints.

A roll of exposed and developed/processed prints for one embodiment is shown in FIG. 2, described below. In some embodiments, index prints for each order and each roll are exposed using HS exposure unit 120.

FIG. 2 shows a batch roll 200 of photographic prints of digital images with index prints of one embodiment. In some embodiments, each order of prints 210 (i.e., 210.1, 210.2, . . . 210.N) includes an order index print 215, and one or more prints 216. In some embodiments (as shown in FIG. 2), the order index print 215 of the first order of prints 210 on a batch roll 200 also serves as a start batch-roll index print 221. In some embodiments, an end batch-roll index print 220 is also added at the end. In some embodiments, the end batch-roll index print 220 includes a redundant set of fingernail images 226 and a name/address information block 227, as well as an end-of-roll bar code 229 (used as a batch-roll identifier).

Figure 3:
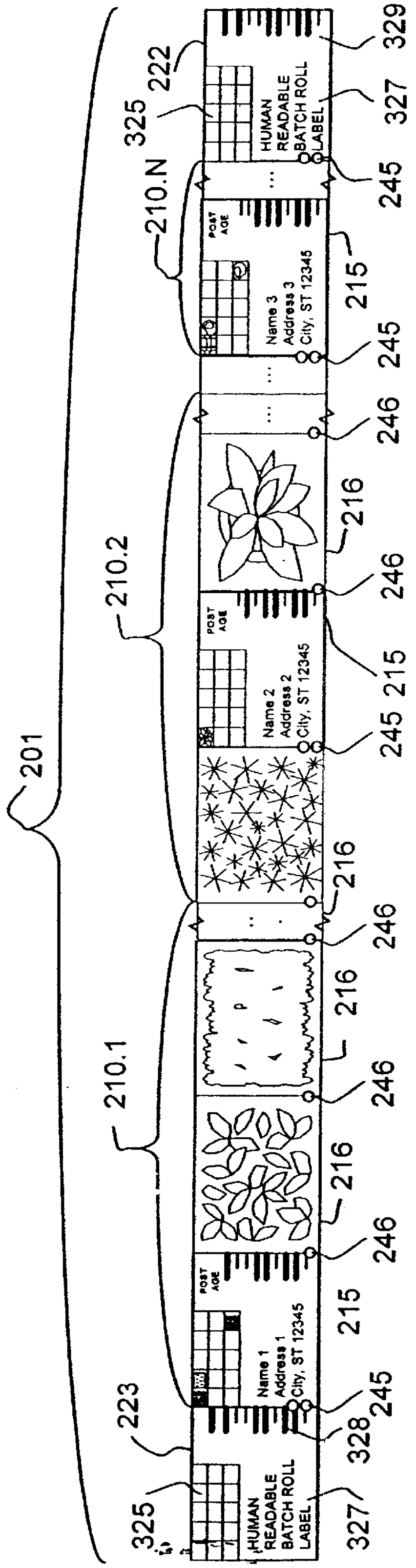
FIG. 3 shows a batch roll 201 of photographic prints of digital images with index prints.

In other embodiments (such as shown in FIG. 3), a batch roll 201 includes a separate batch-roll start index print 223 (which includes start bar code 328, and, in some embodiments, also includes a human-readable batch roll label 327 and/or a test-print area 325 used to test alignment of the color projectors and/or test or adjust the chemical processing variables; but which, in some embodiments, may omit fingernail prints 226 and/or address 227) is added before the order index print 215 of the first order of prints 210. In some embodiments, an end batch-roll index print 222 is also added at the end. In some embodiments, the end batch-roll index print 222 includes a human-readable batch roll label 327 and/or a test-print area 325 used to test alignment of the color projectors and/or test or adjust the chemical processing variables, as well as an end-of-roll bar code 329 (used as a batch-roll identifier). Unless indicated otherwise, where the embodiments of following discussion use batch roll 200 of FIG. 2, other embodiments use batch roll 201 of FIG. 3 or batch roll 202 of FIG. 4.

Figure 4:
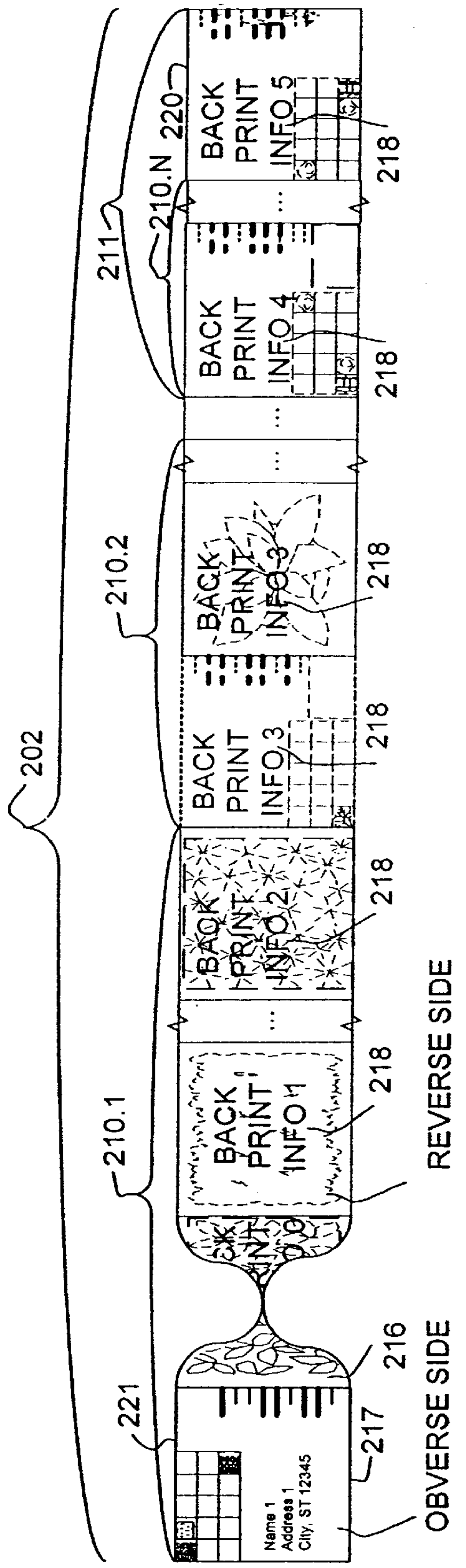
FIG. 4 shows a batch roll 202 of photographic prints of digital images with index prints.

FIG. 4 shows a batch roll 202 having backprinting. Batch roll 202 is identical to batch roll 200 of FIG. 2, except that batch roll 202 includes backprinting on some or all image prints 216 and index prints 215. FIG. 4 shows the obverse of batch roll index print 221 and a portion of the first image print 216, and then shows a half twist to show the reverse of the rest of the prints. The image of the obverse is shown in dotted lines, but is generally not visible from this reverse-side view. In some embodiments, each backprinting message 218 is different and matched to the image on the obverse side of the prints 215 or 216.

FIG. 5 shows a block diagram of a printer portion 500 of high-speed printing system 100, showing more details of one embodiment. Although one of each unit is shown, it is to be understood that in some embodiments, a system 100 can include one or more of each unit (120, 140, 150, 160) shown here, or can combine units, or omit one or more of these units. In the embodiment shown, high-speed exposure unit 120 exposes the photographic paper, processing unit 140 (in some embodiments, each processing unit 140 is a chemical processing unit for color photographic print paper) develops the images, backprinting unit 150 prints information on the back (reverse side) of some or all of the prints coordinated with the image on the front (obverse side), and cutting and packaging unit 160 cuts the batch roll into individual prints and sorts, stacks, collates, and/or wraps the prints.

In the embodiment shown, high-speed exposure unit 120 includes one or more source rolls (121, 122), optionally includes paper selector/splicer 123, includes image projector 125 and includes take-up roll 126. Some embodiments of this system 100 further include a punch unit 127 that removes a plurality of punched-out areas of the substrate (e.g., holes or notches), each such punched-out area being synchronized to a respective image exposure. In some embodiments, an image processor 128 receives image data from image cache 114, and performs some amount of image processing unique to its image projector 125, and may also do more extensive image processing such as rendering, decompressing, adding borders, cropping, white adjustments, etc.

In some embodiments, image projector 125 exposes the photographic paper with three colors to produce red-green-blue or other suitable three-color prints. In other embodiments, four colors are used, where the fourth color produces black portions of the images, in order to obtain more vivid prints. In some embodiments, take-up roll 126 includes facilities to enclose the exposed batch roll in a light-sealed container so that the transport step 129 to processing unit 140 may be performed in or across a lighted room, and/or so exposed rolls can be queued in a lighted area without exposing the latent images to outside light. In other embodiments, both LS exposure unit 120 and processor unit 140 and the path between them are sealed from light, in order to obviate the need for a light-sealed container for roll 126 across path 129. Roll 126 may be kept in a queue waiting for an available processing unit 140.

In some embodiments, processing unit 140 includes a source roll 141 where the batch roll is unrolled and passed through processor 145, which develops the images, and take-up roll 146. In some embodiments, a bar-code reader 147 reads the batch roll's start bar code 228, which provides (or can be correlated to using a table look-up or similar function) a batch roll identifier, (or BRID). Optionally or additionally bar-code reader 147 reads end-of-roll bar code 229, which also provides (or can be correlated to using a table look-up or similar function) a batch roll identifier (or BRID). Bar-code reader 147 transmits this information to scheduler 115 to notify the scheduler 115 that this particular batch roll has been developed, in order to track the processing. Note that the last thing (e.g., the end-of-roll bar code 229) that is exposed will be on the outside of roll 126 and the inside of roll 146, while the first thing (e.g., the batch roll's start bar code 228) that is exposed will be on the inside of roll 126 and the outside of roll 146. Once processing of a batch roll 200 is complete, the roll 146 is transported on path 149 to backprinting unit 150. Roll 146 may be kept in a queue waiting for an available backprinting unit 150.

In some embodiments, backprinting unit 150 prints information on the back (reverse side) of some or all of the prints coordinated with the image on the front (obverse side). In some embodiments, bar-code reader 157 reads the batch roll's start bar code 228 and/or end-of-roll bar code 229 (whichever was exposed first will be on the outside) and transmits this BRID information to scheduler 115 to notify the scheduler 115 that this particular batch roll has been developed, in order to track the processing. In some embodiments, bar-code reader 157 also reads each customer order's bar code 228 (to obtain a customer order identifier, or COID) and transmits this COID information to scheduler 115 to notify the scheduler 115 that this particular customer order is to be backprinted, in order to better track the processing and correlate the backprinting to the image information on the obverse of the prints. In some embodiments, edge detector 158 detects the edge of each successive print. In some embodiments, one or more small holes 245 or 246 (see FIG. 3) or other punched-out areas (e.g., such as a notch punched at an edge of the batch roll) are punched in the photographic-paper batch roll in between each print, to more precisely coordinate the location of the backprinted information and the cutting of prints from the batch roll. A mechanical punching device typically punches the holes. The edge detector 158 detects these holes and transmits synchronization signals to scheduler 115. In some embodiments, the punched-out areas are small rounded notches corresponding to rounded comers in the prints once the prints are cut apart in unit 160 (e.g., a rounded notch can be punched out at the corner of each image, and the cutting unit 160 then cuts from the tip of each top notch to the tip of each bottom notch).

In some embodiments, a high-speed inkjet printer is used to imprint the backprint information, synchronized to the customer order and print edge information from sensors 157 and 158. By having this ink-jet function after the developing function of processor unit 140, higher-quality printing is obtained, since the ink does not get subjected to the chemical processing of processor unit 140. In some embodiments, a source roll 151 is used to dispense the length of paper of the batch roll, and collection roll 156 is used to collect the batch roll after backprinting. Roll 156 is then transported and/or queued 159 to cutter/sorter unit 160, then loaded to roll 161.

In some embodiments, cutting and packaging unit 160 cuts the batch roll into individual prints and sorts, stacks, collates, and/or wraps the prints. In some embodiments, bar-code reader 167 reads the batch roll start bar code 228 and/or end-of-roll bar code 229 (whichever was exposed first will be on the outside) and transmits this BRID information to scheduler 115 to notify the scheduler 115 that this particular batch roll has been developed, in order to track the processing. In some embodiments, bar-code reader 167 also reads each customer order's bar code 228 (to obtain a customer order identifier, or COID) and transmits this COID information to scheduler 115 to notify the scheduler 115 that this particular customer order is to be backprinted, in order to better track the processing and correlate the sorting of cut prints. In some embodiments, edge detector 168 detects the edge of each successive print as defined by the holes 245 or 246 described above, to more precisely coordinate the cutting of prints from the batch roll. Edge detector 168 detects these holes 245 or 246 and transmits synchronization signals to scheduler 115. In some embodiments, a high-speed cutter is used to cut a thin strip including the hole information, synchronized to the print edge information from sensor 168. In some embodiments, angled bins 166 are used to collect prints, wherein all prints of one customer order are stacked in a single bin. In some embodiments, a conveyor-belt mechanism is used on bins 166 to convey the stacked prints 155 to a shipping area. In some embodiments, the bar code from each shipped order is read by a sensor (not shown) to indicate to scheduler 115 that the particular order has been shipped, signaling the end of the printing process. In some embodiments, the image data can then be erased. In other embodiments, the image data is retained, in order to be able to generate reprints for a subsequent customer order.

Figure 6:
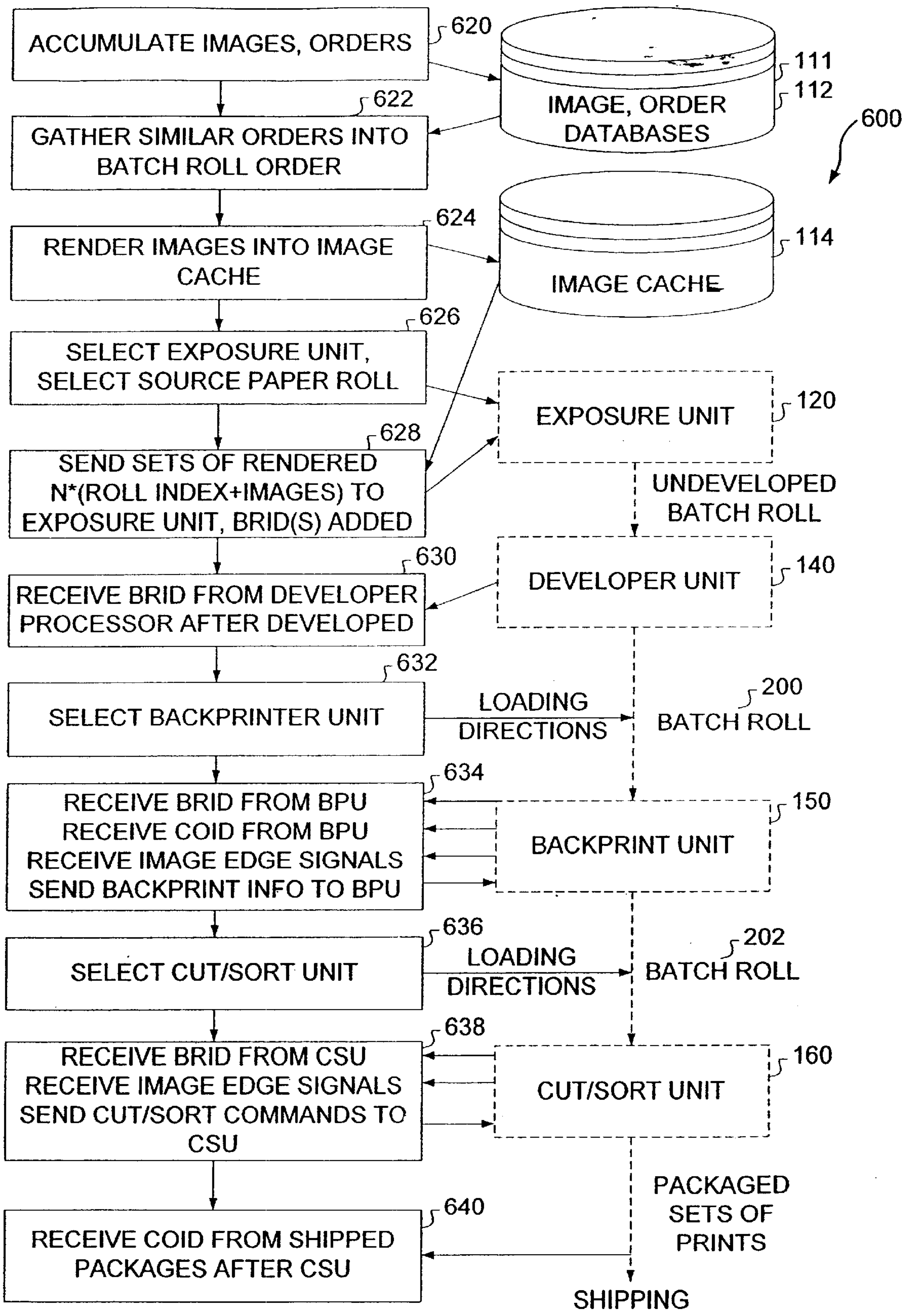
FIG. 6 shows a flow diagram 600 used by scheduler 115 and printer portion 500 of high-speed printing system 100.

FIG. 6 shows a flow diagram 600 used by scheduler 115 and printer portion 500 of high-speed printing system 100. In various embodiments, some or all of these blocks are executed in the order shown. In other embodiments, a different order of selected blocks is used. At block 620, system 100 accumulates digital images into image archive database 111, and orders into order database 112. In some embodiments, these two databases are merged as portions of a single database. At block 622, scheduler 115 gathers similar orders into a batch-roll order having one or more customer orders (e.g., a plurality of orders that will be printed on the same type and size of paper). In some embodiments, rather than an exposure unit 120 exposing a single huge batch roll, several smaller batch rolls are exposed, in order that, for example, the first batch roll exposed can be moved to a processor unit 140 for processing while the second batch roll is being exposed. In some embodiments, one batch roll is exposed in a first exposure unit 120 simultaneously with another batch roll being exposed in a second exposure unit 120, in order to obtain greater throughput.

At block 624, the source images are rendered into exposable image data. In some embodiments, a separate image-rendering unit 113 is provided to preprocess much of the computation-intensive portions of the image rendering process (e.g., decompression, color correction, cropping, adding borders, etc.). In some embodiments, a printer-independent intermediate image format (e.g., JPEG format) is used, in order that any print order can be exposed on any exposure unit. This forces a relatively larger portion of the image rendering into the exposure units 120, thus slowing the exposure function, since rendering into the low-level image format must be done in the exposure units 120. In other embodiments, a printer-dependent intermediate image format (e.g., a bit-map specifically designed for a particular exposure engine) is used, in order to reduce the amount of image processing done in any exposure unit. This forces a relatively larger portion of the image rendering into the rendering units 115, since rendering into the low-level image format must be done before the data reaches the exposure units 120.

At block 626, the scheduler selects an exposure unit 120, and in some embodiments, selects one of a plurality of source sensitive-paper rolls (e.g., glossy versus matte finish, or different sizes of paper) within that exposure unit 120 to use. In some embodiments, a single batch roll can be exposed onto a length of sensitive-paper that is spliced together from one length from each of a plurality of different rolls (using, e.g., splicer 123 of FIG. 5).

At block 628, scheduler 115 causes the plurality of rendered images to be projected onto the photographic paper of batch roll 200 to expose the images. In various embodiments, a batch roll identifier ("BRID") bar code index print is added to the beginning end and ending end of the batch roll 200. In some embodiments, the customer order identifier ("COID") bar code is added to each index print for each subjob (discussed more below), wherein a subjob is that portion (perhaps all) of a customer's order that is exposed on one batch roll. The entire customer order may include two or more subjobs each exposed on a different batch roll, for example, in order to have different sized prints in one customer order. Further, one customer order may include two or more subjobs on a single batch roll, for example, when a customer wants to send sets of prints to each of two or more addressees.

The undeveloped batch roll is then transported to the processor unit 140, where it is unrolled, developed, and re-rolled. In some embodiments, the undeveloped batch roll is placed inside a light-sealed container for transport between the exposure unit and the processor unit, and in some embodiments, the light-sealed container has a bar code on the outside. This container bar code is used to track the various undeveloped batch rolls during this time. Once the batch roll 200 is developed, a bar-code reader (or other sensor for machine-readable codes) reads the BRID from the end of the developed batch roll 200 and transmits it to the scheduler 115.

At block 630, the scheduler 115 receives the BRID (e.g., 328 and/or 329) from the end(s) of the developed batch roll 200, telling the scheduler 115 that developing has completed.

At block 632, the scheduler 115 transmits loading instructions (e.g., to a human operator or to automated transport mechanisms) to specify which backprinting unit 150 is to be used for this batch roll 200. The developed batch roll is then transported to the backprinting unit 150, where it is unrolled, identified backprinted, and re-rolled.

At block 634, the scheduler 115 receives the BRID (e.g., 328 and/or 329) code read from the end(s) of the developed batch roll 200. In some embodiments, the COID is also read by the backprinting unit (BPU) 150 and transmitted to the scheduler 115. The developed batch roll is then backprinted. In some embodiments, image-edge signals are used to synchronize the backprinting in order to align the backprinting with the obverse images. In some embodiments, the image-edge signals are generated by sensors that detect punched-out areas (such as small holes) that correspond to the positions of the images. The scheduler 115 causes the backprinting information (text, bar codes, markings, and/or images) to be transmitted to the BPU 150.

At block 636, the scheduler 115 transmits loading instructions to specify which cutting/sorting unit 160 is to be used for this batch roll 200.

The developed and backprinted batch roll 202 is then transported to the backprinting unit 150, where it is unrolled, cut into prints (optionally removing the areas having holes or splices) that are sorted, stacked, consolidated, inspected, packaged, and shipped. In some embodiments, the cutting is synchronized to image-edge signals detected in the cutting/sorting unit (CSU) 160. The sorting groups all the prints from one subjob into one stacking bin. The stacking places these prints into a neat stack. The consolidating collects all the subjobs (e.g., different sized prints, or different types of paper or transparency substrates) that will be shipped to a single address into a single stack. In some embodiments, consolidating includes human operator intervention to collect the various subjobs. In one such embodiment, automated machinery (such as the sorter mechanism) is used to transport the various subjobs to a single bin. In some embodiments, the packaging operation includes wrapping the stacked prints with a film that is at least partially transparent, in order that the address on the top index print is visible. In some embodiments, an indication of postage (i.e., that a certain amount of postage has been/will be paid, wherein the amount is calculated by the scheduler 115 based on the number and size of prints generated) is also visible through the wrapping.

At block 638, the scheduler 115 receives the BRID (e.g., 328 and/or 329) code read from the end(s) of the developed and backprinted batch roll 202. The COID is also read by the CSU 160 and transmitted to the scheduler 115. In some embodiments, the scheduler 115 sends cut/sort commands to the CSU 160, while in other embodiments, the CSU 160 handles much or all of this function by itself.

In some embodiments of the present invention, a printing job can be split into several sub-jobs that are printed by different low-speed or high-speed photographic printers. The printed sub-jobs can be consolidated into one package before shipped to the customer. Details of job consolidation is disclosed in commonly assigned and pending U.S. patent application Ser. No. 09/450,075 entitled "Printing Images in an Optimized Manner" by Baum et al.

At block 640, the scheduler receives the COID value from each completed order as it is shipped out, indicating that a particular order is completely processed.

Advantages

Referring again to FIG. 1, scheduler 115 schedules printing jobs for both high-speed exposure unit 120 and low-speed printer systems 180 for maximized system throughput. Scheduler 115 organizes printing jobs and assures an even workflow through the exposure unit(s) 120, the chemical processor unit(s) 140, the backprinting unit(s) 150, and the cutting/packaging unit(s) 160 so that system throughput is maximized.

In some embodiments, backprinting is performed after the processing of the photographic paper, thus providing higher printing quality (text clarity) and eliminating the interaction between the ink and the chemical-processing solutions. Note that conventional backprinting of other systems is conducted in the exposure unit before chemical processing. The printed ink is thus exposed to the chemical processing solutions in the chemical processors.

In some embodiments, computation-intensive printer-independent image rendering is conducted a synchronously in an image rendering unit 113 before the image data are distributed to the exposure unit printers 120, such that the printing exposure function can be maximized at the maximum printing rate.

Define High-speed Photographic Printer

Other Details of the Invention

The high-speed photographic printing system 100 includes an optional number of low-speed digital photographic printing systems 181-180 and high-speed digital photographic printing systems 500.

In some embodiments, the digital images are stored in the image archive 111. The digital images are processed in the image-rendering unit 113 for tone calibration, image enhancement, and color correction. The processed images are stored in the image cache 114.

The information about job orders by the customers is stored in the order database 112. The scheduler 115 retrieves the job order information from the order database 113, and organizes and schedules printing jobs accordingly. The scheduler 115 communicates with image cache 114 to prefetch all remote images and store them locally to minimize the delay in retrieving the images during rendering and printing.

In some embodiments, the image-rendering unit 113 includes a plurality of image processing computers organized in an image-rendering farm having a rendering-farm controller. The scheduler 115 communicates with the rendering-farm controller to perform all required printer independent rendering. The rendering-farm controller balances the rendering requests among the rendering units it controls.

Scheduler 115 distributes the printing jobs with completed image processing to the low speed printers 180 and high-speed printers 500. The scheduler 115 sends appropriate job order information to the low speed line controllers 116 and high-speed line controllers 117. The corresponding images are respectively transferred from the image cache 114 to the external PC's 181 and the high-speed exposure units 120. The digital images are subsequently exposed by the high-speed exposure unit 120 or printed by the low speed printer 180.

Image cache 114 is used to store pre-rendered digital input image data.

In some embodiments, high-speed photographic printing system 100 (see FIG. 1) includes at least one high-speed printer 500 that includes a high-speed exposure unit 120, a chemical processor 140, a backprinting unit 150, and a cutting/packaging unit 160. In some embodiments, backprinting unit 150 and cutting/packaging unit 160 are combined into a single unit.

Scheduler 115 schedules the printing sequence/timing of the printing jobs as ordered by the customers. Scheduler 115 defines the printing subjobs in a batch roll (see below). Scheduler 115 schedules the batch rolls so that the exposure, processing, the backprinting, and the cutting/packaging each occur at approximately even throughput to maximize system throughput.

Scheduler 115 directs appropriate digital image data to each high-speed exposure unit 120 and low-speed printer system 180 for the scheduled printing subjobs.

Image Rendering Unit 113

With increased image enhancement features, the image processing can be a potential bottleneck if it is implemented synchronously with the printing. The purpose of the image-rendering unit 113 is to perform image rendering that is independent of a specific printer. Such printer-independent image rendering is asynchronous to the time of printing (it could be up to 24 hours or more before exposure, depending on the size of the image cache 114) and thus does not affect the printing throughput.

In some embodiments, rendering includes borders and/or effects. A template is composited with the image well before printing, and thus does not need to be synchronous with printing. Other rendering effects used in some embodiments are: white balance, sharpening, tone, image enhancement or other effects. In some embodiments, rendering includes printer-dependent enhancements, such as individual calibration of each printer exposure unit, image resampling, and/or resizing. Image rendering unit 113 thus provides scalability, independent of number of printers. The image rendering unit 113 renders images independent of printer type and printing rates, that is, it provides device independence. Since some of this image processing does not depend on any device-specific information it can be rendered well before it is required for printing, and even before a specific exposure unit is assigned. Thus in some embodiments, since the image rendering unit 113 is a printer-device-independent renderer, it is possible to render device-independent output images well before the images are printed. The rendering rate of each rendering unit in a rendering farm can be significantly lower than the printing rate. In fact, as soon as a print order requiring a particular print is scheduled, the render farm can "pre-render" the image and temporarily cache the output data on a disk drive. In some embodiments, the pre-rendering may occur up to 24 hours prior to actually printing the image.

In some embodiments, image rendering unit 113 uses low cost, off the shelf rendering nodes, resulting in high price/performance computing, and scalability to any throughput rate.

In some embodiments, image rendering unit 113 uses a simple XML/URL based API (extended markup language/universal resource locator), and file based (NFS) and URL-based output. Thus, the individual rendering units can be distributed anywhere on the internet, and rendering tasks can be distributed and gathered to and from these distributed units.

In some embodiments, printer-dependant enhancements are performed to each image during distribution of the images to the printers. The dynamic nature of these enhancements, which are correlated with the state of the printer at time of printing, requires this additional render pass.

In some embodiments, high-speed exposure unit 120 includes at least one supply roll 121, 122 and at least one take-up roll 126. Some typical embodiments provide two or three supply rolls and two or three take-up rolls. The rolls of paper are coated with photosensitive material and spooled on a roller, and contained in light-sealed magazines.

In some embodiments, different supply rolls are spliced together to form a continuous web (e.g., using splicer 123). Thus, different types of paper can be exposed: glossy, matte, and/or even different paper widths. The web is exposed and is cut to the correct length as defined by the batch roll. The exposed batch roll is spooled in a take-up roller in a light-sealed magazine that is moved to the input of the chemical processor.

Batch Roll 200

In some embodiments, each roll of exposed photographic paper is exposed as a batch of printing subjobs is defined.

Each subjob is one customer order, or a subset of one customer order (wherein the rest of that customer order is one or more subjobs in other batches of printing). That is, a set of images from one or more customer orders is grouped, and enough paper is unrolled from a source cartridge 121 or 122, exposed with the images, and the exposed paper for that one "batch roll" is spooled onto a light-sealed magazine 126 for transporting to a separate, possibly different-speed chemical processor box 140. Each batch roll 200 is scheduled and assigned to one of one or more high speed exposure units 120 by the scheduler 115. Each batch roll 200 can share a common product feature such as print size, paper type, and the business partner (e.g., yahoo.com) for whom the printed images are fulfilled. In some embodiments, each batch roll 200 can include two or more different types or sizes of papers spliced end-to-end. Each batch roll 200 will stay intact in the processor unit (also called the "chemical processor box") 140 and the backprinting unit 150, and is fed into the cutting/packaging unit 160, where the individual printed images are cut and printing subjobs are separated and packaged. In some embodiments, the maximum length of the exposed batch roll is limited by what is allowed in a given light-sealed magazine. In some embodiments, the end of a batch roll is defined so as to coincide with the availability of downstream units to take in work. That is, scheduler 115 calculates a length that will minimize idle time for every unit 120, 140, 150, and 160.

Each batch roll 200 (or 201, or 202: see FIGS. 2, 3, 4) includes at least a portion 210 of one printing job. A printing job is a printing order from a customer. A subjob 210 is a subset of a printing job, which is a useful division, particularly when a job includes different sizes of prints in a single order. After all subjobs of a printing order are printed, the subjobs are pulled together for shipping. Each subjob 210 includes a job index print 215 and at least one image 216. The job index print 215 typically includes the user address information 227, thumbnail images 226 of the images 216 in the printing job, a machine-readable bar code 228 for identifying the printing job, and optionally, a user message for the printing job. Optionally, postage 228 is printed (i.e., exposed) directly into the job-index print 215, and the printing job is wrapped in transparent plastic to be mailed directly without a separate mailing label.

In some embodiments such as shown in FIG. 3, subjobs are separated by double punched holes 245. The printed images by single punched holes 246. In one embodiment having splices, the splice area is normally longer than the typical slug (about ⅛"). The splice area is separated by double punched holes 245 so that the white splice area (unexposed) can be easily sorted out from the printed jobs. In some embodiments, a plurality of possible hole locations, and optional holes at each location define a binary code into which batch information is encoded, in order to provide additional verification to the scheduler that the holes read correspond to the correct job.

Index Prints for Batch Roll

In some embodiments, each batch roll 200 of exposed photographic paper includes batch roll index prints 220, 221 or 222, 223 at either the beginning or the end (or both) of the roll. The lead 221 or end 220 index prints include visible information that define the batch roll; for example, paper type, print size, the partner's name for whom the batch roll is printed, etc. In some embodiments, a machine-readable bar code 228, 229 is also included. The bar code identifies the batch roll and the printing jobs within the batch roll 200 to scheduler 115. In some embodiments, a COID index print serves a dual purpose, both indicating a BRID for a batch roll 200, as well as a COID for a particular subjob 210.

Roll Sequence, Shipment Confirmation

In some embodiments, the printing sequence needs to be carefully controlled for tracking the printing jobs and proper stacking of printed images in the packages that are to be mailed.

In the example as illustrated in FIG. 5, the images are always on the outside of the batch rolls 200 in the post-development units (after unit 140 and 150). The batch rolls 200 are contained in light-sealed magazines in the high-speed exposure unit 120 and until they are fed though the chemical processor 140. In the backprinting unit 150, a scanner 157 scans the lead roll index print 221 (or 220, depending on the end fed first) for a processed batch roll 200. The backprinting data is retrieved for the printing jobs in the batch roll 200, and printed as synchronized by the print-edge signal from sensor 158. In the cutting/packaging unit, each roll is in reverse sequence from the backprinting. In some embodiments, for each printing job, the last image is stacked in the bottom first. A stack of prints in a printing job is finished with the job index print on top. A technician visually examines the job and scans the bar code on the index print to confirm the completion of the job. The stack of prints is inserted into a package with proper mailing label visible for shipment.

Backprinting

In some embodiments, a scanner 157 scans the bar code in the roll index print 221. The backprinting unit 150 synchronizes the batch roll of printing jobs with the appropriate backprinting information, retrieving the appropriate information, and sequence backprinting data with the printing jobs in each batch roll.

Four-color Printing

In accordance to the present invention, the high-speed printing system 100 can produce photographic images on an enhanced photographic paper having four-color emulsion layers (yellow, magenta, cyan, plus black). As in the conventional photographic printing process, the yellow, magenta, and the cyan emulsion layers are respectively sensitized to blue, green and red photons. Yellow, magenta, and cyan dye images are formed as a result of blue, green and red image-wise exposures. In accordance to the present invention, an additional black layer is provided forming black dye image. To avoid cross-spectral sensitization, the black emulsion layer is spectral sensitized to outside of the visible spectrum (of red, green, blue photons). Preferably, infrared spectral sensitization dyes are adsorbed on the silver halide emulsion grains to provide the spectral sensitization. An infrared IR LED print head can be used to fulfill such exposure. The formation of the black dyes can be achieved by black forming dye molecules, or by a balanced mixture of yellow, magenta, and cyan color-formation dyes. The image rendering unit 113 preprocess the input digital image and convert the input colors into four color planes corresponding to the exposure levels for each of the blue, green, red, and infrared exposures that in turn form yellow, magenta, cyan and black dye images on the enhanced photographic paper. For example, an input digital image can be provided in a RGB color space. The RGB colors are mapped into the YMCK color space. Typically, the black color is formed at image areas where there are high neutral densities. The onset of the color densities where the black color appears can be adjusted using an Under-Color Removal (UCR) algorithm that is known in the art. For each particular 4-color enhanced photographic paper and 4-color photographic printer, the UCR is used to optimize the benefit of increase in color gamut and the cost of increase grain noise by the black colors.

It should be noted that the 4-color photographic printing disclosed in the present invention is feasible as a result of the digital rendering in image rendering unit 113 and digital printing for the photographic printers. The 4-color photographic printing cannot be easily implemented in the conventional analog photographic printing process. The conventional analog photographic printing projects a frame of a color image in the (negative) photographic film to form a visible (negative) color image on a photographic paper. There is no easy way to separate the three red, green, blue colors into 4-color exposures. Furthermore, an invisible light source and image pattern is also not available from such optical projection through the photographic film to facilitate such a 4-color separation.

An advantage of the enhanced photographic paper and the digital 4-color printing is that the color gamut is increased by the additional black color-formation dyes. In the conventional 3-color photographic paper, the yellow, magenta, and cyan dyes are required to provide not only each individual colors, but also good neutral colors. This neutral color requires that the yellow, magenta, and cyan dyes can be mixed to provide a relatively flat absorption across the whole visible spectrum, which severely restricts the selection of yellow, cyan, and magenta dyes. The availability of the black dye in the enhanced photographic paper, in accordance with the present invention, allows the selection of yellow, cyan, and magenta dyes having more saturated and pure colors. As a result, color gamut is increased.

Other advantages of the enhanced photographic paper and the digital 4-color printing include higher maximum black density, increased dynamic range for the neutral density, and sharper black texts. The 4-color photographic printing (paper and printer) is particularly advantageous for printing a black-and-white image in which the dynamic range is much increased.

Another advantage of having a separate black (K) layer is that this layer can be coated as the outer (or the top) emulsion layer, which reproduces sharp, detailed edges in the photographic or graphic art images in the finished photos. In the conventional 3-color (CMY) emulsions, a deep, neutral black color requires exposing all three dye layers, and delivering developer chemistry to these three layers in turn to develop them equally. Since the top layer gets first use of the developer, the layers below it only receive the remainder of the developer. The bottom layer has least access to the developers. Good blacks therefore require longer processing time in the developer bath, thinner emulsion layers, and/or more potent developers. They also require relatively higher exposure levels for the lower layers, leading to non-linear behavior over the color space with special compensation in the imaging color management system.

In contrast, a good black color in a 4-color (CMYK with K as the top layer) photographic paper does not need the development of the lower (CMY) layers. There is no competition for developing chemistry by the lower layers. Conversely, saturated colors need no black, so the top layer does not compete for developer chemistry on its way to the lower one or two exposed layers. It may impede the diffusion of developer slightly, but since at most two layers are being deeply exposed at any one time, the development rate is comparable or higher than those in a 3-color (CMY) photographic paper.

Thus, there is a need for high-speed printing of digital images. Photopaper (i.e., any suitable photographic paper such as used for making prints from photographic negatives) provides a high-quality medium for "printing" images from digital image data. Digital image data is typically compressed, for example, using the JPEG (joint picture experts group) defined standard. Other formats for digital image data are also used, including, for example, BMP-type bitmap, TIFF-type tagged image file format, GIF-type graphics interchange format, EPS-type encapsulated Postscript™, PSD-type Photoshop™, etc. "Digital images" are data files, such as JPEG files, containing image data for one or more images, typically along with information used to decode the data, such as the width and height in pixels. Rendering unit 113 is used to uncompress and render the image data.

An image printing fulfiller, such as Shutterfly.com, provides services to print digital images. Typically, unexposed source photopaper is provided on large rolls 121, 122, which come in various widths. A strip of this source photopaper is unrolled within a light-sealed exposure unit 120. take the image data, decompress and/or process the images, and generate colored light patterns that are projected onto photopaper to expose the images thereon. In addition to decoding/decompressing the image, the processing of the images by rendering unit 113 and/or exposure unit 120 can include such services as color correction, cropping, and/or adding a border pattern. This overall process is called "rendering," and is generally performed under the control of a computer. Some such computers use hardware accelerators to speed the process, while others perform the process completely in software. The exposed photopaper is then developed and cut into individual prints. Optionally, data (such as the date, and even customized descriptions provided by the customer) is also printed on the back of each individual print (called "backprinting") at some point in the process. Typically, a high-speed ink-jet process is used for backprinting.

Conventional all-in-one exposure/processor/cutter systems feed a continuous strip of photopaper through an exposure section, a processor section and then a cutter section. Typically, such systems are limited by the slowest component, since even if one of the components could operate faster, the continuous strip of photopaper forces all components to operate at the same speed as the slowest. Were such a system adapted to print digital images, the rendering process is also a potential performance bottleneck, especially when performing more complicated or involved processing. Thus, if attempting to maintain a high speed, one can be limited as to the types or amounts of rendering processing that will be allowed. Further, if backprinting is performed before developing the paper (e.g., at roughly the same time as the exposing step), the quality of that backprinting degrades due to chemical interactions and/or heat drying used in the developing process. Thus, all-in-one units can compromise performance, quality, or both.

Thus, some embodiments of the present invention provide separate units for one or more of the printing processes of rendering, exposing, developing, backprinting, cutting, stacking, consolidating, and wrapping. These separate units 120, 140, 150, and/or 160 are controlled and coordinated by a scheduler computer 115 that tracks the print images of individual customer orders or portions thereof, through all of the units. Since each separate unit can now run at its own maximum speed, various numbers of replications of individual units are provided in some embodiments. For example, two exposure units 120 (even two units running at different speeds) can expose photopaper, one processor unit 140 can develop all the exposed paper, four cutting units 160 might be needed to cut and stack the prints, and the scheduler computer 115 is used to track each customer order. If needed, the scheduler computer helps consolidate different portions of a single customer order that was split for processing, and now needs to be gathered into a single package for mailing.

Sometimes, a customer order will include a request for prints in different sizes, or different types of photopaper, or different image processing. In such cases, it is often advantageous to use different exposure units 120, or to serially feed strips from different photopaper source rolls (121 versus 122) through a single exposure unit 120. A larger format is slower to expose due to longer exposure times for a given total amount of light projected to wider and/or bigger prints. These separate strips 200 are then developed, cut and stacked. If portions of a single customer order are on separate strips 200, the appropriate portions are then stacked into a single stack in bins 166.

It is sometimes useful to provide a less-expensive slower printer 180 as an overflow buffer to supplement a more-expensive faster printer, especially when the average demand at a facility does not justify fully duplicating the faster printer.

In some embodiments, batch rolls 200 are rolled between printing functions to ease handling. In other embodiments, batch rolls 200 are not rolled, and can be called job strips. The term “batch roll” will be used to apply for any job strip whether or not rolling is used. In some embodiments, continuous webs are generated by splicing job strip-style batch rolls 200 together, and not rolling the job strips between steps).

By allocating groups of customer orders into batch rolls 200, these individual portions can be readily handled and loaded into each subsequent function. If repairs or other interruptions are needed for one unit (120, 140, 150, or 160), the other units can continue and batch rolls 200 can be queued until that interrupted unit is brought back on-line, or rescheduled for other like units that can substitute for the unit offline. This also allows ready handling of a mix of high-speed and low-speed units, such as combining a small-format fast printer with large-format slower printer.

Individual customer orders with different-sized prints can be allocated to the appropriate two or more exposure units 120 (e.g., for greater speed on a single size of paper, or to accommodate two or more different paper sizes, paper types, or other print features), the separate batch rolls 200 developed, the tracked prints of that single customer order are backprinted on with the appropriate text and/or images, and the scheduler tracks the location of the prints in the two or more subjobs, which are then cut, stacked and consolidated. In some embodiments, the cut prints go next to a stacker, and the scheduler commands the stacker to generate a single stack with the prints of all the subjobs of the single customer order. In other embodiments, two different stacks are generated, each with an index print having a special color to allow an operator to manually recognize and consolidate the cut and stacked subjobs with one another.

In some embodiments, a single exposure unit 120 is provided. The single exposure unit 120 includes two or more different paper types and/or widths on large source rolls 121 and 122. Each customer order having two or more different size/type prints is divided into subjobs 210. One or more of such subjobs 210 are grouped by size/type, and a batch of each size/type of images is exposed onto an appropriate length of the appropriate photopaper (this length is called a “job strip” or “batch roll”) and the batch roll 200 is optionally spooled onto a roll 126 (called a “jobroll”) for moving to the processor unit 140. In some embodiments, the jobrolls 126 are put light-sealed containers (“magazines”) to move from the light-sealed exposure unit 120 to a separate light-sealed processor unit 140 across a lighted area. In other embodiments, both the exposure unit 120 and the processor unit 140 are located in the same light-sealed room or enclosure, thus obviating the need for a light-sealed magazine. In yet other embodiments, the batch roll 200 of exposed paper is not rolled, but is instead transported length-wise to the processor unit. Some embodiments roll the batch roll 200 after each operation for easy transport between each subsequent unit; other embodiments keep the strip extended lengthwise between units.

In some embodiments, each batch roll 200 of photopaper includes a roll index print 221 identifying that specific batch roll 200 to the human operators and the computerized scheduler 115. In some embodiments, the roll index print is repeated, once 221 at the start of the batch roll, and again 220 at the end, in order that when the batch roll 220 is rolled with the end print on the inside of the roll (e.g., after developing) the starting roll index print will be on the outside and readable, and when the batch roll 200 is rolled with the starting print on the inside of the roll (e.g., after backprinting) the ending roll index print will be on the outside and readable. In some embodiments, the obverse side is kept on the outside of the roll after all post-development steps to make it readily accessible for reading. (Before the batch roll is developed, this obverse side can be either inside or outside, since the exposed but undeveloped paper cannot be exposed to extraneous light.

In other embodiments, a subjob index print 215 (i.e., the index print of an individual customer order, which is bar coded) is used as a roll index print 221 as well, since the scheduler 115 knows which batch roll 220 included which print jobs. In some embodiments, the job index print 215 used as a end-of-roll index print 221 or 220 will simply have an additional bar code or other mark (such as a color square) indicating to the system operators that this job index print 215 also serves as a roll index 221 print. In other embodiments, there is no additional bar code or other mark, and the fact that this is an end index print 215 indicates that it is both a roll identifier 221 and a subjob identifier 215. In some embodiments, the initial print of each job is the regular job index print 215, and the first job index print 215 of a roll serves a dual purpose of both a roll identifier and a job identifier. In other embodiments (see FIG. 3), a separate roll index print 223 and 222 is provided at each end of each batch roll 201.

In some embodiments, the last print of a batch roll is an index print 217 that serves as a (second) roll identifier. In some embodiments (see FIG. 3), this last print is a single-purpose roll identifier 222 (rather than a job index print of some job on the batch roll) and includes a bar code or other machine-readable identification pattern, and optionally includes a test-pattern 325 used as quality control to ensure that a predetermined exposure pattern results in the correct print (e.g., color, alignment, sharpness, contrast, brightness, etc.), testing both the paper and its photosensitive coatings, as well as the exposure-processor process. In other embodiments, the last index print 220 (see FIG. 2) is a duplicate of the job index print 215 of the last job 210.N on that batch roll, and is provided as a "bonus" extra index print on the bottom of the stack of prints to the random lucky customer that happened to occupy that position on the batch roll 200. In such cases, the job index print 215 at the start of the batch roll, and the job index print 220 at the end of the batch roll, although different from one another, both serve to uniquely identify that batch roll 200 to the scheduler computer 115. In some embodiments, a bar code or area-code pattern 228 or 229 printed on the job index print 221 or 220 serves to uniquely identify that batch roll 200 when still attached to the batch roll, and then to uniquely identify that customer order 210.N when cut and stacked on the top of the stack of prints for that order (at a time when the roll-batch identifier is no longer needed.

In some embodiments, one or more small holes 245 or 246 (see FIG. 3) is punched between each image 216 printed, at or near the exposure station 120. These holes 245 or 246 serve to help align the cutting process of unit 160 to the exposure process of unit 120 such that the cuts are made between prints rather than in the middle of prints. In some embodiments, the cutting process removes a small slice between each print, the slice including the one or more holes 245 or 246. In some embodiments, a single hole 246 is punched between each print (for example, at a lower edge) and a hole in a different location, or a plurality of holes 245, or a different size or shape hole is punched between jobs of subjobs. This difference between-print holes and between-job holes helps or further helps the scheduler computer determine the boundaries between jobs, e.g., to assist stacking separate jobs in different slots. In other embodiments, the same hole pattern 246 is used in every instance, and an optical reader, such as a bar-code reader, is used to search for and identify each job index print. In yet other embodiments, a count of the number of holes (each corresponding to one print) from each successive job on the batch roll is maintained to determine job boundaries.

Conclusion

One aspect of the present invention provides a photographic printing system 100 (see FIG. 1) for producing prints in response to input digital images. System 100 includes a high-speed exposure unit 120 that exposes a photosensitive material coated on a substrate in response to the input digital image, a chemical processor unit 140 that receives and processes the exposed photosensitive material to form visible dye images on the substrate, a backprinting unit 150 that receives the substrate having the visible dye images and prints information on the opposite surface of the substrate to the dye image, and a cutting unit 160 that produces separate sheets of printed images after the backprinting unit prints information.

In some embodiments, the high-speed exposure unit 120 is capable of exposing at least one thousand, five hundred four-inch by six-inch images in an hour.

In some embodiments, the cutting unit further sorts and packages the printed images.

Some embodiments further include a scheduler 115 that organizes the input digital images into batches of printing jobs. In some embodiments, the scheduler 115 prepares information to be printed on the back of the substrate, and the backprinting unit receives the information from the scheduler for backprinting.

In some embodiments, the exposure unit 120 includes a mechanism to load the substrate having exposed photosensitive material into a light-sealed magazine used to transport to the chemical processor unit 140, the chemical processor unit 140 includes a mechanism to receive the loaded photosensitive magazine, and the exposure unit 120 and the chemical processor unit 140 are separated by an area having ambient light.

In some embodiments, the exposure unit 120 and the chemical processor unit 140 operate at different rates of prints per unit time.

In some embodiments, the chemical processor unit 140 and the backprinting unit 150 operate at different rates of prints per unit time.

In some embodiments, the backprinting unit 150 and the cutting unit 160 operate at different rates of prints per unit time.

In some embodiments, the high-speed exposure unit 120 and the chemical processor unit 140 include a light sealed path for transport of a batch roll of exposed substrate from the exposure unit 120 to the chemical processor unit 140.

In some embodiments, the high-speed exposure unit further comprises a punch unit that removes a plurality of punched-out areas of the substrate, each such punched-out area being synchronized to a respective image exposure.

Some embodiments further include a scheduler 115 that organizes the input digital images into batches of printing jobs, and the backprinting unit 150 includes a sensor 158 that detects the punched-out areas and transmits a synchronizing signal to the scheduler 115 based on the detected punched out areas.

In some embodiments, the scheduler 115 sends backprinting information to the backprinting unit 150 based on the synchronizing signal sent to the scheduler 115 based on the detected punched out areas.

In some embodiments, the backprinting unit 150 includes a sensor 158 that detects the punched-out areas, and the backprinting unit 150 prints backprinting information based on the detected punched out areas.

In some embodiments, the cutting unit 160 includes a sensor that detects the punched-out areas and cuts individual prints based on the detected punched out areas.

Another aspect of the present invention provides a method for high-speed photographic printing of input digital images onto a photosensitive material coated on a substrate. This method includes (a) exposing the photosensitive material based on the input digital images, (b) chemically processing the exposed photosensitive material to form visible dye images on the substrate, (c) after the chemical processing, backprinting information on an opposite surface of the substrate to the dye image, and (d) cutting the substrate to produce separate sheets of printed images, wherein the exposure is performed at an exposing rate, the chemically processing is performed at a processing rate and the exposing rate is different from the chemically processing rate.

Some embodiments of the method, after the exposure and before the chemically processing, further include (e) rolling the substrate having the exposed photosensitive material into a light-sealed container, and (f) moving the light-sealed container having the loaded substrate.

Some embodiments of the method, after the chemically processing and before the backprinting, further include (g) rolling the processed substrate onto a roll, and (h) unrolling the processed substrate from the roll.

Some embodiments of the method, after the backprinting and before the cutting, further include (g) rolling the processed substrate onto a roll, and (h) unrolling the processed substrate from the roll.

Some embodiments of the method further include (g) exposing at least one digital images and a bar code onto an index print for a customer order.

Some embodiments of the method further include (g) exposing at least one digital images and a mailing address of a customer onto an index print.

Some embodiments of the method further include (g) exposing an identification marking onto an index print for identifying the roll of the photosensitive material. Some such embodiments further include (h) exposing at or near both ends of the roll of the photosensitive material an identification marking onto an index print for identifying the roll of the photosensitive material.

In some embodiments, the backprinting is performed at a rate different from the rate of the chemically processing.

Some embodiments of the method further include transporting a batch roll of exposed substrate after the exposure and before the chemically processing in a light sealed path.

Some embodiments of the method further include removing a plurality of punched-out areas of the substrate, each such punched-out area being synchronized to a respective image exposure.

Some embodiments of the method further include detecting the punched-out areas, and backprinting information unique to each respective one of a plurality of prints based on the respective detected punched-out areas.

Some embodiments of the method further include exposing the photosensitive material with a machine-readable customer-order identifier corresponding to the input digital images, detecting the machine-readable customer-order identifier, and backprinting information unique to each respective one of a plurality of prints based on the respective detected machine-readable customer-order identifier.

Some embodiments of the method further include exposing the photosensitive material with a machine-readable customer-order identifier corresponding to the input digital images, detecting the machine-readable customer-order identifier, detecting the punched-out areas, and backprinting information unique to each respective one of a plurality of prints based on the detected machine-readable customer-order identifier and on the respective detected punched-out areas.

Some embodiments of the method further include detecting the punched-out areas, and cutting individual prints based on the detected punched out areas.

Another aspect of the present invention provides a batch roll 200 (or 201 or 202) of photosensitive material exposed in response to at least one input digital image from a user. The batch roll includes at least one exposed first image 221 (or 220 or 222 or 223) that includes a machine-readable marking for identifying the batch roll, such exposed image being located at an end of the batch roll, at least one exposed second image 216 corresponding to the input digital image, and at least one exposed third image 215 that includes first user address information 227 corresponding to the input digital image 216.

Some embodiments of the batch roll further include at least one exposed fourth image having a machine-readable marking for identifying the batch roll, such exposed image being located at an end of the batch roll opposite the end of the batch roll of the first image.

Some embodiments of the batch roll 200 further include at least one exposed fifth image having a machine-readable marking for identifying the batch roll, such exposed image being located at an end of the batch roll opposite the end of the batch roll of the first image.

In some embodiments, the batch roll 200 is chemically developed to fix the exposed images.

In some embodiments, the third image further includes a machine-readable marking for identifying a customer order corresponding to the second image.

Some embodiments of the batch roll 200 include a plurality of customer order subjobs 210, each subjob including a plurality of exposed images 216 corresponding to a plurality of input images for a single user, and a subjob index print 215 having user address information 227 corresponding to the user.

In some embodiments, each subjob index print further includes a machine-readable marking for identifying a customer order corresponding to the user.

In some embodiments, each subjob index print further includes a marking serving as postage.

In some embodiments, each subjob index print further includes a thumbnail image corresponding to each of the plurality of exposed images of the corresponding subjob.

Some embodiments of the batch roll 200 further include a plurality of first punched-out areas each corresponding to a printed image edge of each respective one of the plurality of exposed images of the corresponding subjob.

Some embodiments of the batch roll 200 further include a second punched-out area distinguishable from the plurality of first punched-out areas and corresponding to a respective one of the subjobs.

Yet another aspect of the present invention provides a photographic printing system 100 (see FIG. 1) for producing prints in response to input digital images. System 100 includes a scheduler 115 that receives digital images and scheduling the digital images to be exposed on different exposure units, a first exposure unit 120 that exposes a photosensitive material coated on a substrate being in response to the input digital image scheduled by the scheduler, wherein the scheduler causes a first subjob of a single customer order to be exposed on the first exposure unit, a second exposure unit 120 that exposes a photosensitive material coated on a substrate in response to the input digital image scheduled by the scheduler, wherein the scheduler causes a second subjob of the single customer order to be exposed on the second exposure unit, and a sorter unit 160 that consolidates cut-apart prints of the first subjob and the second subjob into a single group of prints.

Some embodiments of this system further include a chemical processor unit 140 that receives and processes the exposed photosensitive material to form visible dye images on the substrate, a backprinting unit 150 that receives the substrate having the visible dye images and prints information on the opposite surface of the substrate to the dye image, and a cutting unit 160 that produces separate sheets of printed images after the backprinting unit prints information.

Other embodiments of this system further include a chemical processor unit 140 that receives and processes the exposed photosensitive material to form visible dye images on the substrate, and a cutting unit 160 that produces separate sheets of printed images after the backprinting unit prints information.

Some embodiments of this system further include a backprint exposure unit (not shown, but similar to exposure projector 125) that exposes information on a photosensitive surface of the substrate opposite to the dye image side.

In some embodiments, the scheduler 115 causes the first exposure unit 120 to expose a first subjob identification marking 228 onto an index print to identify the first subjob, and causes the second exposure unit 120 to expose a second subjob identification marking 228 onto an index print to identify the second subjob.

Some embodiments of this system further include a punch unit 127 that removes a plurality of punched-out areas of the substrate, each such punched-out area being synchronized to a respective image exposure.

In some embodiments, the punch unit 127 includes a laser (not shown) used to remove the plurality of punched-out areas of the substrate.

In some embodiments, the punch unit 127 removes a punched-out area of the substrate synchronized to each respective subjob.

Printer-Independent Rendering

Some embodiments of this system further include an image-rendering unit 113 operatively coupled to provide data representing rendered digital images to the first exposure unit 120 and the second exposure unit 120. Image-rendering unit 113 renders the input digital images (e.g., from image archive 111) to generate rendered digital image data (e.g., stored into image cache 114). The image rendering is independent of one or more specific characteristics of the respective first exposure unit and second exposure unit. For example, the first exposure unit 120 might use positive film and thus would project a positive image, while the second exposure unit might use negative film and thus project a negative image. In this case, image rendering unit 113 would decompress and process the images, but would not generate the positive or negative versions. The first exposure unit 120 and the second exposure unit 120 process the rendered digital images in accordance with the one or more specific characteristics of the respective first exposure unit and second exposure unit (for example, generating the positive or negative images they might need). Such processed images are then subsequently exposed by the respective first exposure unit 120 and second exposure unit 120.

Printer-Dependent Rendering

Some embodiments of this system further include an image archive 111, an image cache 114, and an image-rendering unit 113 operatively coupled to receive image data from the image archive 111 and to provide data representing rendered digital images to the image cache 114. In this case, the image-rendering unit 113 renders the input digital images to generate rendered digital image data, wherein the image rendering is different and dependent on one or more specific characteristics of the respective first exposure unit and second exposure unit. For example, the first exposure unit 120 might use positive film and thus would project a positive image, while the second exposure unit might use negative film and thus project a negative image. In this case, image rendering unit 113 would decompress and process the images, but would also generate the positive or negative versions specifically suited to a particular exposure unit. Such processed images are then exposed by the respective first exposure unit 120 and second exposure unit 120.

Still another aspect of the present invention provides a photographic printing system 100 (see FIG. 1) for producing prints in response to input digital images. System 100 includes a scheduler 115 that receives digital images and scheduling the digital images to be exposed at different exposure units, a low-speed exposure unit 180 that exposes a photosensitive material coated on a substrate being in response to the input digital image scheduled by the scheduler 115, a high-speed exposure unit 120 that exposes a photosensitive material coated on a substrate in response to the input digital image scheduled by the scheduler 115. In this case, the high-speed exposure unit 120 is capable of exposing images at a maximum printing rate substantially higher than the maximum printing rate of the low-speed exposure unit 180.

In some embodiments, the high-speed exposure unit 120 is capable of exposing images at a maximum rate at least three times higher than the maximum rate of the low-speed exposure unit 180.

Some embodiments of this system further include a chemical processor unit 140 that receives and processes the exposed photosensitive material from the exposure unit to form visible dye images on the substrate, a backprinting unit 150 that receives the substrate from the chemical processing unit having the visible dye images and prints information on the opposite surface of the substrate to the dye image, and a cutting unit 160 that produces separate sheets of printed images after the backprinting unit prints the information.

Some embodiments of this system further include a sorter unit 160 that consolidates cut-apart prints of a first subjob exposed on the low-speed exposure unit 180 and a second subjob exposed on the high-speed exposure unit 120 into a single group of prints.

In some embodiments, the low-speed exposure unit 180 uses photographic paper of a first width, and the high-speed exposure unit 120 uses photographic paper of a second width different than the first width.

Still another aspect of the present invention provides a photographic printing system 100 (see FIG. 1) for producing prints in response to input digital images. System 100 includes a scheduler 115 that receives digital images and schedules the digital images to be exposed at different exposure units, a print unit 180 that exposes and develops a photosensitive material coated on a substrate being in response to the input digital image scheduled by the scheduler, a high-speed exposure unit 120 that exposes a photosensitive material coated on a substrate in response to the input digital image scheduled by the scheduler, a chemical processor unit 140 that receives and processes the exposed photosensitive material from the exposure unit to form visible dye images on the substrate, a backprinting unit 150 that receives the substrate from the chemical processing unit having the visible dye images and prints information on the opposite surface of the substrate to the dye image, and a cutting unit 160 that produces separate sheets of printed images after the backprinting unit prints the information. In this case, print unit 180 both exposes and develops the prints, and optionally backprints, cuts and/or sorts the prints.

Some embodiments of this system further include a sorter unit 160 that consolidates cut-apart prints of a first subjob of a single customer order exposed on the print unit 180 and a second subjob of the single customer order exposed on the high-speed exposure unit 120 into a single group of prints.

Some embodiments of this system further include a punch unit 127 that removes a plurality of punched-out areas 245 of the substrate, each such punched-out area 246 being synchronized to a respective image exposure 216.

In some embodiments, the punch unit 127 comprises a laser used to remove the plurality of punched-out areas of the substrate.

In some embodiments, the punch unit 127 removes a punched-out area 245 of the substrate synchronized to each respective subjob 210.

Some embodiments of this system further include an image-rendering unit 113 as described above.

Another aspect of the present invention provides a photographic printing system 100 (see FIG. 1) for producing prints in response to input digital images. System 100 includes one or more photographic printers 500, an image processor 128 operatively coupled to each printer (e.g., part of exposure unit 120 or in side the LS or HS controllers), and an image-rendering unit 113, operatively coupled to transmit data representing rendered digital images to each respective image processor 128, wherein the image-rendering unit renders the input digital images to generate rendered digital image data and transmits the rendered digital image data to the image processor 128, wherein the image rendering is independent of one or more specific characteristics of the photographic printers, wherein the image processor 128 processes the rendered digital images in accordance with the one or more specific characteristics of each respective photographic printer, such processed images being subsequently printed by the respective photographic printer.

Some embodiments of this system further include a scheduler 115 that schedules transmission of the data representing the rendered digital images to the image processor 128 for each photographic printer 500.

Some embodiments of this system further include an image archive 111, and an image cache 114, wherein the image-rendering unit 113 is operatively coupled to receive image data from the image archive 111 and to provide data representing rendered digital images to the image cache 114.

Another aspect of the present invention provides a photographic printing system 100 (see FIG. 1) for producing prints in response to input digital images. System 100 includes a plurality of photographic printer exposure units 120, an image cache 114, an image rendering unit 113 that renders the input digital images and is operatively coupled to place the rendered images into the image cache 114. A scheduler 115 is operatively coupled to the plurality of photographic printer exposure units 120, and schedules the rendered digital images from the image cache 114 to be printed by each exposure unit 120, and an image processor 128 associated with each printer for receiving the rendered digital images and processing the rendered digital images in accordance to the specific characteristics of the exposure unit 120, and such processed images being subsequently printed by the exposure unit 120.

In some embodiments, the image-rendering unit decompresses the input digital images.

In some embodiments, the image-rendering unit adds a border pattern to the input digital images.

In some embodiments, the image-rendering unit provides white balance to the input digital images.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A photographic printing system for producing prints in response to input digital images, the system comprising:

a high-speed exposure unit that exposes a photosensitive material coated on a substrate, such exposure being in response to the input digital image;

a chemical processor unit that receives and processes the exposed photosensitive material to form visible dye images on the substrate;

a backprinting unit that receives the substrate having the visible dye images and prints information on the opposite surface of the substrate to the dye image; and a cutting unit that produces separate sheets of printed images after the backprinting unit prints information.

2. The photographic printing system of claim 1, wherein the high-speed exposure unit is capable of exposing at least one thousand five hundred four-inch by six-inch images in an hour.

3. The photographic printing system of claim 1, wherein the cutting unit further sorts and packages the printed images.

4. The photographic printing system of claim 1, further including a scheduler that organizes the input digital images into batches of printing jobs.

5. The photographic printing system of claim 4, wherein the scheduler prepares information to be printed on the back of the substrate, and the backprinting unit receives the information from the scheduler for backprinting.

6. The photographic printing system of claim 1, wherein the exposure unit includes a mechanism for loading the substrate having the exposed photosensitive material into a light-sealed magazine such light sealed magazine being transferable to the chemical processor unit, the chemical processor unit includes a mechanism for receiving the loaded photo-sensitive magazine, the exposure unit and the chemical processor unit being separated by an area having ambient light.

7. The photographic printing system of claim 1, wherein the exposure unit and the chemical processor unit operate at different rates of prints per unit time.

8. The photographic printing system of claim 1, wherein the chemical processor unit and the backprinting unit operate at different rates of prints per unit time.

9. The photographic printing system of claim 1, wherein the backprinting unit and the cutting unit operate at different rates of prints per unit time.

10. The photographic printing system of claim 1, wherein the high-speed exposure unit and the chemical processor unit include a light sealed path for transport of a batch roll of exposed substrate from the exposure unit to the chemical processor unit.

11. The photographic printing system of claim 1, wherein the high-speed exposure unit further comprises a punch unit that removes a plurality of punched-out areas of the substrate, each such punched-out area being synchronized to a respective image exposure.

12. The photographic printing system of claim 11, further including a scheduler that organizes the input digital images into batches of printing jobs, wherein the backprinting unit includes a sensor that detects the punched-out areas and transmits a synchronizing signal to the scheduler based on the detected punched out areas.

13. The photographic printing system of claim 12, wherein the scheduler sends backprinting information to the backprinting unit based on synchronizing signal to the scheduler based on the detected punched out areas.

14. The photographic printing system of claim 11, wherein the backprinting unit includes a sensor that detects the punched-out areas and prints backprinting information based on the detected punched out areas.

15. The photographic printing system of claim 11, further comprising a punch unit that removes a plurality of punched-out areas of the substrate, each such punched-out area being synchronized to a respective image exposure.

16. The photographic printing system of claim 1, wherein the punch unit comprises a laser used to remove the plurality of punched-out areas of the substrate.

17. The photographic printing system of claim 1, wherein the punch unit removes a punched-out area of the substrate synchronized to each respective subjob.

18. A method for high-speed photographic printing of input digital images onto a photosensitive material coated on a substrate, comprising:

a) exposing the photosensitive material based on the input digital images;

b) chemically processing the exposed photosensitive material to form visible dye images on the substrate;

c) after the chemical processing, backprinting information on an opposite surface of the substrate to the dye image; and d) cutting the substrate to produce separate sheets of printed images.

19. The method of claim 18, after the exposure and before the chemically processing, further comprising:

e) rolling the substrate having the exposed photosensitive material into a light-sealed container; and f) moving the light-sealed container having the loaded substrate.

20. The method of claim 18, after the chemically processing and before the backprinting, further comprising:

g) rolling the processed substrate onto a roll; and h) unrolling the processed substrate from the roll.

21. The method of claim 18, further comprising:

e) exposing at least one digital image and a bar code onto an index print for a customer order.

22. The method of claim 18, further comprising:

e) exposing at least one digital image and a mailing address of a customer onto an index print.

23. The method of claim 18, further comprising:

e) exposing an identification marking for identifying the roll of the photosensitive material.

24. The method of claim 18, further comprising:

e) exposing at or near both ends of the roll of the photosensitive material an identification marking for identifying the roll of the photosensitive material.

25. The method of claim 18, wherein the chemical processing is performed at a different rate as the exposing rate.

26. The method of claim 18, wherein the backprinting is performed at a rate different from the rate of the chemically processing.

27. The method of claim 18, further comprising removing a plurality of punched-out areas of the substrate, each such punched-out area being synchronized to a respective image exposure.

28. The method of claim 27, further comprising:

detecting the punched-out areas; and backprinting information unique to each respective one of a plurality of prints based on the respective detected punched-out areas.

29. The method of claim 18, further comprising:

exposing the photosensitive material with a machine-readable customer-order identifier corresponding to the input digital images;

detecting the machine-readable customer-order identifier; and backprinting information unique to each respective one of a plurality of prints based on the respective detected machine-readable customer-order identifier.

30. The method of claim 18, further comprising:

exposing the photosensitive material with a machine-readable customer-order identifier corresponding to the input digital images;

detecting the machine-readable customer-order identifier;

detecting the punched-out areas; and backprinting information unique to each respective one of a plurality of prints based on the detected machine-readable customer-order identifier and on the respective detected punched-out areas.

31. A batch roll of photosensitive material exposed in response to at least one input digital image from a user, the batch roll comprising:

at least one exposed first image that includes a machine-readable marking for identifying the batch roll, such exposed image being located at an end of the batch roll;

at least one exposed second image corresponding to the input digital image; and at least one exposed third image that includes identification information of the user.

32. The batch roll of claim 31, further comprising:

d) at least one exposed machine-readable marking for identifying the batch roll.

33. The batch roll of claim 32, further comprising:

e) at least one second exposed machine-readable marking for identifying the batch roll, such exposed machine-readable markings being located at the two opposite ends of the batch roll.

34. The batch roil of claim 31, wherein the batch roll is chemically developed to form dye images.

35. The batch roll of claim 31, wherein the third image further includes a machine-readable marking for identifying a customer order corresponding to the second image.

36. The batch roil of claim 31, further comprising a plurality of customer order subjobs, each subjob comprising:

a plurality of exposed images corresponding to a plurality of input images for a single user; and a subjob index print having user address information corresponding to the user.

37. The batch roll of claim 36, wherein each subjob index print further includes a machine-readable marking for identifying a customer order corresponding to the user.

38. The batch roll claim 36, wherein each subjob index print further includes a marking serving as postage.

39. The batch roll of claim 36, wherein each subjob index print further includes a thumbnail image corresponding to each of the plurality of exposed images of the corresponding subjob.

40. The batch roll of claim 36, further comprising a plurality of first punched-out areas each corresponding to a printed image edge of each respective one of the plurality of exposed images of the corresponding subjob.

41. The batch roll of claim 40, further comprising a second punched-out area distinguishable from the plurality of first punched-out areas and corresponding to a respective one of the subjobs.

42. A digital printing system for producing prints in response to input digital images, comprising:

a digital printer for producing prints;

an image-rendering unit for rendering the input digital images to generate rendered digital images, wherein the image rendering is independent of specific characteristics of the digital printer; and an image processor for processing the rendered digital images in accordance with the one or more specific characteristics of the digital printer, such processed images being subsequently used by the digital printer to produce the prints.

43. The digital printing system of claim 42, further comprising:

an image cache for receiving the rendered digital images from the image rendering unit and for storing the rendered digital images.

44. The digital printing system of claim 43, further comprising:

a scheduler for scheduling the rendered digital images stored in the image cache to be printed by the digital printer.

45. A photographic printing system for producing photographic prints in response to input digital images, comprising:

a photographic printer that produces a dye image on a photosensitive material coated on a substrate in response to the input digital image;

an image-rendering unit for rendering the input digital images to generate rendered digital images, wherein the image rendering is independent of specific characteristics of the photographic printer; and an image processor for processing the rendered digital images in accordance with the one or more specific characteristics of the photographic printer, such processed images being subsequently used by the photographic printer to produce the photographic prints.

46. The digital printing system of claim 45 further comprising:

an image cache for receiving the rendered digital images from the image rendering unit and for storing the rendered digital images.

47. The digital printing system of claim 46 further comprising:

a scheduler for scheduling the rendered digital images stored in the image cache to be printed by the digital printer.

48. The system of claim 45, wherein the image rendering unit decompresses the input digital images.

49. The system of claim 45, wherein the image rendering unit adds a border pattern to the input digital images.

50. The system of claim 45, wherein the image rendering unit provides color and tone calibration, sharpening, and white balance to the input digital images.

51. A photographic printing system comprising:

a scheduler for receiving input digital images and scheduling different sets of digital images to be printed at different photographic printers;

a low speed photographic printer that forms dye images on a photosensitive material in response to a set of input digital images scheduled by the scheduler;

a high speed photographic printer that forms dye images on a photosensitive material in response to a different set of input digital images scheduled by the scheduler, wherein the high-speed photographic printer is capable of exposing images at a maximum printing rate substantially higher than the maximum printing rate of the low-speed photographic printer.

52. The photographic printing system of claim 51, wherein the high-speed photographic printer is capable of exposing images at a maximum rate of at least three times higher than the maximum rate of the low speed photographic printer.

53. A photographic printing system comprising:

a scheduler that receives digital images and schedules the digital images to be exposed at different exposure units;

a low-speed exposure unit that exposes a photosensitive material coated on a substrate in response to the input digital image scheduled by the scheduler;

a high-speed exposure unit that exposes a photosensitive material coated on a substrate in response to the input digital image scheduled by the scheduler, wherein the high-speed exposure unit is capable of exposing images at a maximum printing rate substantially higher than the maximum printing rate of the low-speed exposure unit.

54. The photographic printing system of claim 53, further comprising:

a chemical processor unit that receives and processes the exposed photosensitive material from the exposure unit to form visible dye images on the substrate;

a backprinting unit that receives the substrate from the chemical processing unit having the visible dye images and prints information on the opposite surface of the substrate to the dye image; and a cutting unit that produces separate sheets of printed images after the backprinting unit prints the information.

55. The photographic printing system of claim 53, further comprising:

a chemical processor unit that receives and processes the exposed photosensitive material to form visible dye images on the substrate; and a cutting unit that produces separate sheets of printed images after the backprinting unit prints information.

56. The photographic printing system of claim 53, further comprising:

a sorter unit that consolidates cut-apart prints of a first subjob exposed on the low-speed exposure unit and a second subjob exposed on the high-speed exposure unit into a single group of prints.

57. The photographic printing system of claim 53, wherein the low-speed exposure unit uses photosensitive paper of a first width, and the high-speed exposure unit uses photosensitive paper of a second width different than the first width.

58. An enhanced photographic printing system for producing photographic prints in response to input digital images having a plurality of pixels, each of which including color code values, comprising:

a) an enhanced photographic paper coated with four color emulsion layers;

b) a photographic printer, including:

i) an exposure unit for exposing the enhanced photographic paper using four light sources having significantly different spectral characteristics;

ii) a chemical processor for processing the exposed enhanced photographic paper to form a dye image corresponding to the digital image.

59. The enhanced photographic printing system of claim 58 wherein the four color emulsion layers respectively produce yellow, magenta, cyan and black color dye image after the chemical processing.

60. The enhanced photographic printing system of claim 58 wherein each of the four light sources emits substantially in the red, green, blue, and infrared spectral ranges.

61. The enhanced photographic printing system of claim 58 further comprising an image rendering unit that converts the color code values in the input digital images to four-color values corresponding to the exposure values of the four light sources in the exposure unit.

* * * * *